Patented July 8, 1930

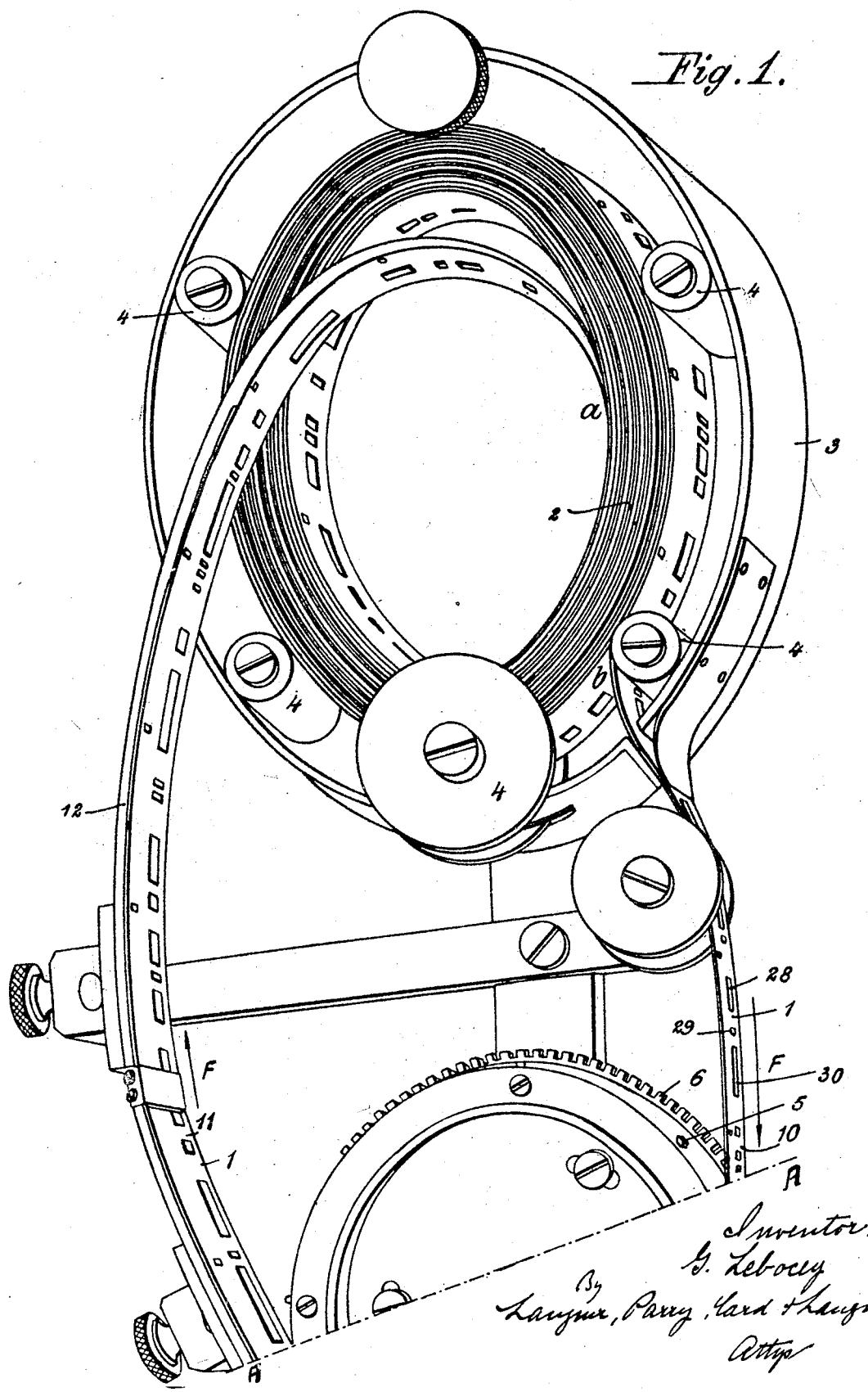

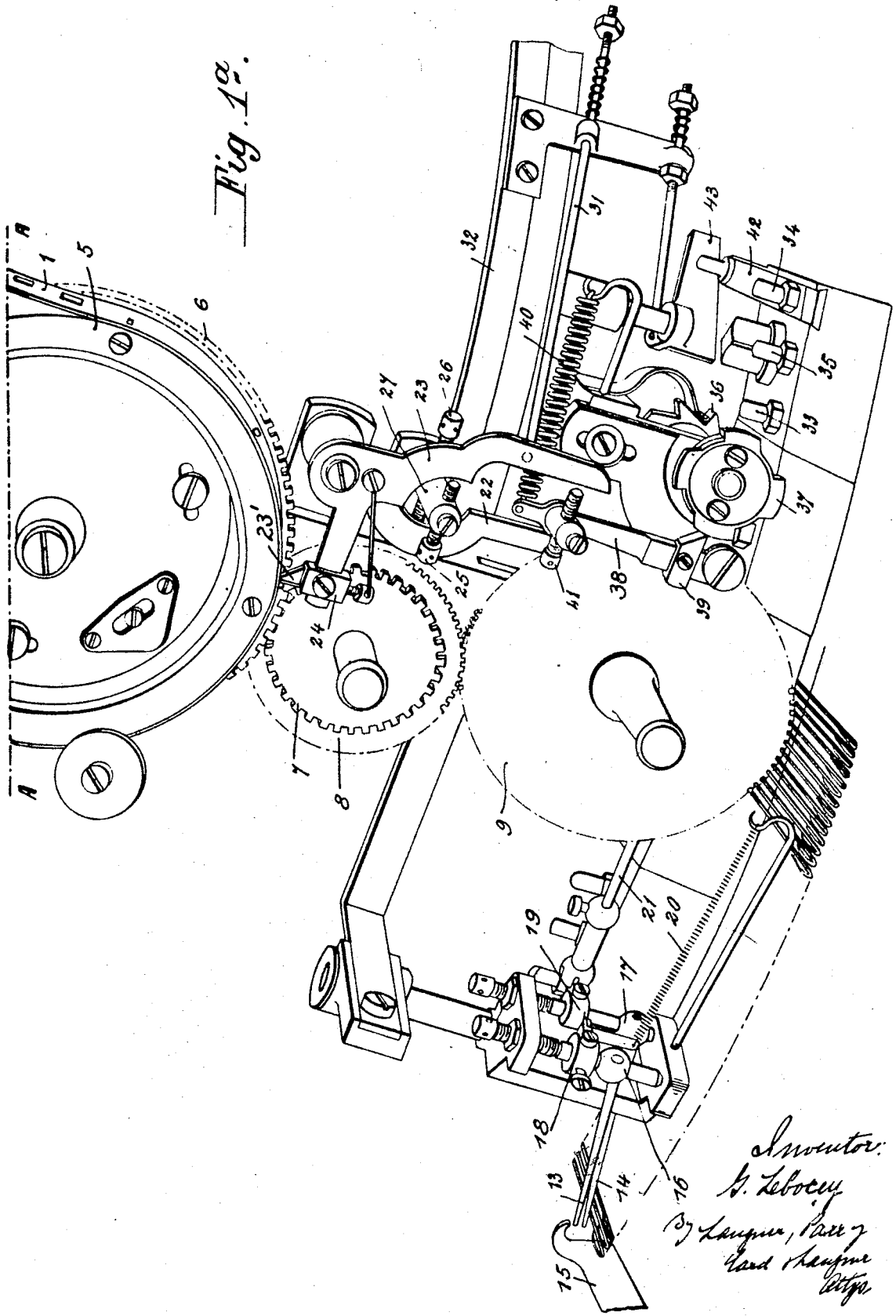

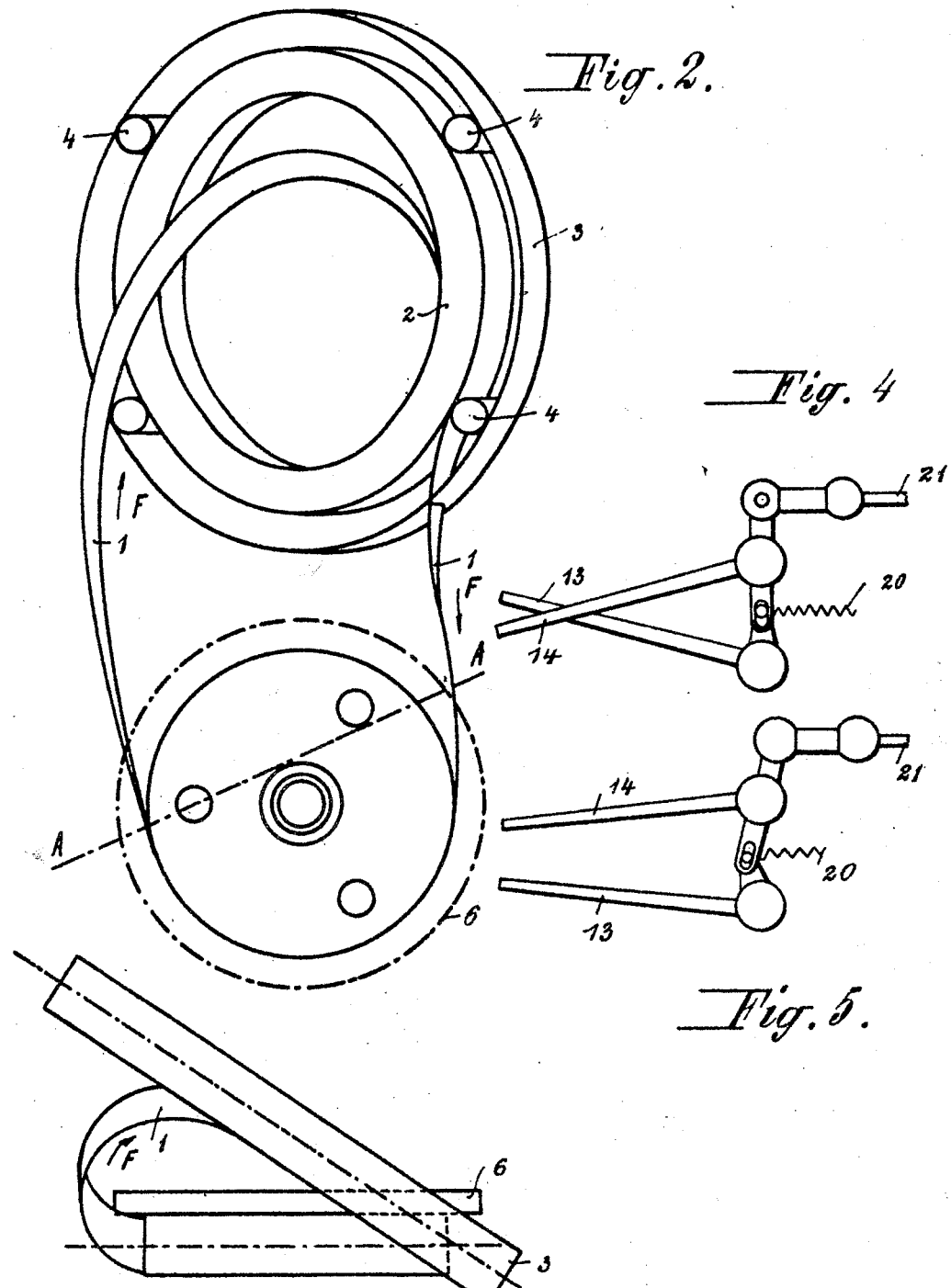

1,770,316

UNITED STATES PATENT OFFICE

GASTON LEBOCEY, OF TROYES, FRANCE

DEVICE FOR THE TRAVEL OF ENDLESS BANDS

Application filed May 21, 1928, Serial No. 279,562, and in France March 3, 1928.

Endless bands are employed in the manufacturing industries in general and in the hosiery and textile industry in particular, said bands having a variable nature and length and being adapted to drive apparatus for the production of patterns or for like uses.

The principal defect in the use of such bands consists in the large size of the band-supporting device, due to the great number of rollers usually employed, as well as the large diameter of the latter, which is made necessary to avoid an excessive stress upon the metal of the band.

For these reasons, certain constructors have abandoned the endless band for a band with free ends, by which the bobbin can be more readily unwound. However, this arrangement necessarily sacrifices the principal advantage of the endless band which alone can be given a continuous straight or circular motion.

The present invention relates to a device which supports the endless bands in their travel, and even bands of a great length, and which is of a very small size for all purposes for use of the said band. The said arrangement may be combined with a mechanism which enables the obtainment of new patterns and effects upon straight and circular looms provided with hooked needles.

The appended drawing shows by way of example a constructional form of an apparatus according to the invention as employed with a circular hosiery machine provided with hooked needles secured in their recesses.

Figures 1 and 1ª show the parts, separated on the line A—A of a perspective view of the apparatus according to the invention.

Figures 2 and 3 are diagrammatic elevational and plan views of the general apparatus formed by the juxtaposition of Figures 1 and 1ª.

Figures 4 and 5 are plan views showing the yarn tubes in two different positions.

The band 1 as a whole is wound in such manner as to form a bobbin 2 containing any desired number of turns according to the length of the band 1. The minimum diameter of the bobbin will be obviously proportional to the flexibility of the band 1 in order to obviate an excessive stress on the material.

The bobbin 2 may be contained (Fig. 1) in a casing 3 which is disposed upon a roller device consisting of a set of rollers or balls 4, or it may be supported by any other suitable means.

The two ends of the band may be joined by soldering or welding, or by suitable clasps.

The apparatus is actuated by a toothed drum 5 coacting with a series of perforations in the said band.

In the apparatus shown in the drawings by way of example, the drum 5 is driven by the gearing 6—7—8—9 coacting with gearing mounted on the movable part of the machine. The ratio of the set of gears is properly calculated so as to provide for a suitable speed of the band according to the motion of the needles.

The bobbin 2 is situated in a plane which is oblique to the plane of the driving drum 5, so that the band can be unwound from the interior of the ring.

The direction of the motion is shown by the arrow F.

Contrary to what might appear, the strand which controls the rotation of the bobbin is not the descending strand 10, but the ascending strand 11. For this purpose, a curved guide 12 constantly supports the band, so that the latter forms a rigid connection between the actuating device 5 and the ring 2.

The length of the band 1, which is wound at $a$ in the interior of the ring is always equal to the amount unwound from $b$ at the same time, so that there will be a certain slip at a very slow rate of each turn upon the adjacent turn, the diameter of the ring remaining constant.

For a suitable use upon hosiery machines for the obtainment of patterns by the simple crossing of the supplied yarn, the apparatus is completed by the device represented below by way of example.

The tubes 13 and 14 are adapted to receive the yarn and this is looped upon the needles by the laying plates of a known type 15. The said tubes are supplied by yarn of different colors. The relative position of these tubes determines the color of the fabric on the right and the wrong side.

If by any suitable means I reverse at a given time the position of the two guide tubes 13 and 14, the color at first on the right hand side of the fabric will be transferred to the wrong side, and inversely.

To obtain any desired pattern, it will thus be sufficient to impart to the yarn guide an alternating movement of the same amplitude which is subject to a time law accurately determined according to the patterns to be reproduced.

The tubes 13 and 14 are mounted on two pivoted axles 16 and 17 which are connected together by a jointed device consisting of the cranks 18 and 19.

In the inoperative position, the tubes 13 and 14 are held in the crossed position shown in the diagrammatic Figure 4 by the spring 20. Any traction on the link 21 will cause the simultaneous pivotation of the two tubes, which assume the position shown in the diagrammatic Fig. 5.

The link 21 is connected with the pivoted lever 22 secured to the lever 23. A contact piece 23' whose height is adjustable is in constant contact with the band 1 under the action of the spring 20. Since this action is transmitted by means of the parts 16—17—18—19—21—22—23, all the wear can be taken up in this manner.

I employ a set of adjustable stops consisting of the two screws 25 and 26 mounted on the support 27, in order to regulate at will the amplitude of oscillation of the levers 22 and 23 and hence the resulting displacement of the yarn guiding tubes 13 and 14. The band, during its rotation on the drum 5, offers to the member 24 a set of perforations such as 28, 29 and 30. When a perforation of the band coincides with the member 24, the lever 23 turns on its axle and makes contact with the screw 25, and this pivotation changes the position of the yarn guide. The travel of an imperforate part of the band upon the member 24 will cause a pivotation in the contrary direction which is imparted to the yarn guide and thus again moves the supplied yarn.

To the said apparatus is added a mechanism which permits to obtain, at determined periods, and according to the requirements of the pattern, the automatic stopping of the actions of the band 1 upon the yarn guide 13 and 14.

For this purpose, the device formed by the set of pivoted levers 22 and 23 is connected by a link 31 with a support 32, which is given an alternate displacement by a counter of the known type. This combination also permits the obtainment of horizontal bands in alternate disposition, either in one color or in patterns.

To permit the obtainment of vertical bands in one color or in patterns, it is quite necessary to stop the action of the band at closely spaced intervals, and this is not provided for by the said counter. For this purpose, a set of small removable studs 34, 35, etc., are disposed on a ring secured to the movable part of the machine.

The travel of each stud below the ratchet wheel 36 turns the latter by one tooth at a time and hence causes a corresponding rotation of the cam 37 provided with bosses. The pivoted lever 38 provided with a projection 39 is constantly pressed upon the cam 37 by the spring 40. The upper end of the lever 38 is provided with a striker consisting of the screw 41. This latter strikes with great force upon the lever 23 when the projection 39 drops into a recess in the cam 37. By this action, the lever 23 will pivot on its axis and will entirely release the projection 24 from the band 1.

Since the studs 33—34—35 are placed at equal intervals upon the periphery of the machine, the resulting fabric will consist of vertical bands having a pattern, alternating with plain bands.

If one of the studs 34 for instance is placed out of action, the position of the bands which are plain or carry patterns will be respectively inverted, and this will afford checkerwork designs.

To place one of the studs 34 out of action in an automatic manner, said stud is mounted on a slide 42 controlled by a removing or shifting device (known per se) which consists of a pivoted plate 43 secured to a counter.

I claim:

1. In a device for the travel of endless bands, a perforated band wound upon itself in order to form a bobbin containing tightly-pressed turns as well as a hanging loop formed by said band, an actuating drum engaged in the said hanging loop, for the forward travel of the band, a rotatable needle bed, needles supported thereby, a set of gearing connecting the actuating drum with the needles of the rotatable needle bed, a pivoted bell-crank lever, a stationary axle carrying the said lever, a projection mounted on one arm of said lever and coacting with the perforations of the metallic band, yarn-guiding tubes pivoted to parallel axles, a pivoted arm mounted on the said lever, and a link connecting the said lever with the yarn-guiding tubes in such manner that the yarn-guiding tubes may occupy two different positions.

2. In a device for the travel of endless bands, a perforated band wound upon itself in order to form a bobbin containing tightly-pressed turns as well as a hanging loop formed by said band, an actuating drum engaged in the said hanging loop, for the forward travel of the band, a rotatable needle bed, needles supported thereby, a set of gearing connecting the actuating drum with the needles of the rotatable needle bed, a pivoted bell-crank lever, a stationary axle carrying the said lever, a projection mounted on one arm of said lever and coacting with the perforations of the metallic band, a pivoted arm mounted on said lever, two yarn-guiding tubes pivoted to parallel axles, arms secured to said tubes, a slot formed in one of the said arms and coacting with the axle carrying the other arm, a lever secured to one of the yarn-guiding tubes, and a link connecting the said arm with the arm coacting with the said bell-crank lever, whereby the yarn-guiding tubes may occupy two different positions.

3. In a device for the travel of endless bands, a perforated band wound upon itself in order to form a bobbin containing tightly-pressed turns as well as a hanging loop formed by said band, a rotatable needle bed and needles, supported thereby, two yarn-guiding tubes pivoted to parallel axles, an actuating drum engaged in the said hanging loop, for the forward travel of the band, means by which the said drum may be driven from the set of needles, a pivoted lever, a projection mounted on one arm of said lever and coacting with the perforations of the band, two yarn-guiding tubes pivoted to parallel axles, means for imparting the angular displacements of said pivoted lever to the said yarn-guiding tubes whereby they will assume two different positions, and means whereby the control of the metallic band upon the yarn-guiding tubes is caused to cease.

4. In a device for the travel of endless bands, a band wound upon itself in order to form a bobbin containing tightly-pressed turns as well as a hanging loop formed by the said band, a rotatable needle bed and needles, supported thereby, two yarn-guiding tubes pivoted to parallel axles, means for effecting the travel of the band in synchronism with the angular displacements of the set of needles, and for effecting the relative angular displacements of the pivoted yarn guiding tubes, and an arm adapted for reciprocating motion which acts upon the control system of the said yarn-guiding tubes whereby the action of the said control system relatively to the band is periodically made operative or inoperative.

5. In a device for the travel of endless bands, a perforated band wound upon itself in order to form a bobbin containing tightly-pressed turns, as well as a hanging loop formed by the said band, a rotatable needle bed and needles, supported thereby, two yarn-guiding tubes pivoted to parallel axles, means for effecting the travel of the band in synchronism with the angular displacements of the set of needles and for effecting the relative angular displacements of the pivoted yarn-guiding tubes, a set of contact pieces disposed at suitable intervals upon the set of needles, a ratchet wheel which is actuated by the said contact pieces, a cam provided with projections, controlled by the said ratchet, a pivoted lever actuated by said cam for the control of the said bell-crank lever, thereby releasing the said projection from its engagement with the perforations of the metallic band.

6. In a device for the travel of endless bands, a perforated band wound upon itself in order to form a bobbin containing tightly-pressed turns as well as a hanging loop formed by the said band, a rotatable needle bed, and needles supported thereby, two yarn-guiding tubes pivoted to parallel axles, means for effecting the travel of the band in synchronism with the angular displacements of the set of needles, and for effecting relative angular displacements of the pivoted yarn-guiding tubes, a set of contact pieces disposed at suitable intervals upon the set of needles, a ratchet wheel which is displaced by the said contact pieces, a cam provided with projections, controlled by the said ratchet, a pivoted lever actuated by the said cam for the control of the said bell-crank lever, thereby releasing the said projection from its engagement with the perforations of the metallic band, and means for placing out of action the said contact pieces mounted on the movable set of needles.

7. In a device for the travel of endless bands, a band upon itself in order to form a bobbin containing tightly pressed turns as well as a hanging loop formed by the said band, a rotatable needle bed, and needles supported thereby, two yarn-guiding tubes pivoted to parallel axles, means for effecting the travel of the band in synchronism with the angular displacements of the set of needles, and for effecting relative angular displacements of the pivoted yarn-guiding tubes, a set of contact pieces disposed at suitable intervals upon the set of needles, radial slots formed in the latter, slides coacting with said slots and carrying certain of the said contact pieces, stops disposed on the respective contact pieces, a pivoted plate actuated under periodic control and coacting with said stops in such manner as to move the corresponding stops out of their normal circular paths.

8. In a device for the travel of endless bands, a perforated band wound upon itself in order to form a bobbin containing tightly-pressed turns as well as a hanging loop formed by said band, an actuating drum engaged in the said hanging loop for the forward travel of the band, a rotatable needle bed, needles supported thereby, a set of gearing connecting the actuating drum with the needles of the rotatable needle bed, a pivoted bell-crank lever, a stationary axle carrying the said lever, two regulating screws for said lever, a projection mounted on one arm of said lever and coacting with the perforations of the metallic band, yarn-guiding tubes pivoted to parallel axles, a pivoted arm mounted on the said lever, a link connecting the said lever with the yarn-guiding tubes in such manner that the yarn-guiding tubes may occupy two different positions.

9. In a device for the travel of endless bands, a perforated band wound upon itself in order to form a bobbin containing tightly-pressed turns as well as a hanging loop formed by said band, an actuating drum engaged in the said hanging loop, for the forward travel of the band, a rotatable needle bed, needles supported thereby, a set of gearing connecting the actuating drum with the needles of the rotatable needle bed, a pivoted bell-crank lever, a stationary axle carrying the said lever, two regulating screws for said lever, a projection mounted on one arm of said lever and coacting with the perforations of the metallic band, a pivoted arm mounted on said lever, two yarn-guiding tubes pivoted to parallel axles, arms secured to said tubes, a slot formed in one of the said arms and coacting with the axle carrying the other arm, a lever secured to one of the yarn-guiding tubes, and a link connecting the said arm with the arm coacting with the said bell-crank lever, whereby the yarn-guiding tubes may occupy two different positions.

In testimony whereof I have signed my name to this specification.

GASTON LEBOCEY.